United States Patent
Nossik et al.

(10) Patent No.: US 10,326,744 B1
(45) Date of Patent: Jun. 18, 2019

(54) SECURITY LAYER FOR CONTAINERS IN MULTI-TENANT ENVIRONMENTS

(71) Applicant: EMC Corporation, Hopkinton, MA (US)

(72) Inventors: Misha Nossik, Ottawa (CA); Lejin Du, Kanata (CA); Robert Anthony Lincourt, Jr., Pawtucket, RI (US); Ryan Wallner, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 123 days.

(21) Appl. No.: 15/075,858

(22) Filed: Mar. 21, 2016

(51) Int. Cl.
    *H04L 9/14* (2006.01)
    *H04L 29/06* (2006.01)
    *H04L 9/32* (2006.01)

(52) U.S. Cl.
    CPC ............... *H04L 63/06* (2013.01); *H04L 9/14* (2013.01); *H04L 9/32* (2013.01)

(58) Field of Classification Search
    CPC ............... G06F 21/51; G06F 9/45558; G06F 17/30233; H04L 63/145
    See application file for complete search history.

(56) References Cited

U.S. PATENT DOCUMENTS

| 6,577,734 B1 | 6/2003 | Etzel et al. |
| 7,814,318 B1 | 10/2010 | Perlman et al. |

(Continued)

FOREIGN PATENT DOCUMENTS

| CN | 103810046 A | 5/2014 |
| CN | 103870314 A | 6/2014 |

(Continued)

OTHER PUBLICATIONS

U.S. Appl. No. 14/575,080, filed in the name of R. Wallner et al. on Dec. 18, 2014 and entitled "Virtual Network Storage Function Layer Comprising One or More Virtual Network Storage Function Instances."

(Continued)

*Primary Examiner* — Joseph P Hirl
*Assistant Examiner* — Sayed Aresh Beheshti Shirazi
(74) *Attorney, Agent, or Firm* — Ryan, Mason & Lewis, LLP

(57) ABSTRACT

An apparatus comprises at least one container host device implementing containers for respective tenants of a multi-tenant environment. The containers are configured to utilize storage resources of at least one storage platform. A given one of the containers comprises at least one application, and an application file system security layer configured to communicate with the storage platform. The application file system security layer comprises a container storage volume supported by the storage platform, and an encryption engine configured to encrypt and decrypt data of the container storage volume utilizing one or more data encryption keys that are encrypted under a tenant-specific key encryption key. The tenant-specific key encryption key is provided to the application file system security layer by a tenant key manager that is external to the container. The tenant key manager is illustratively controlled by the tenant for which the given container is implemented.

20 Claims, 9 Drawing Sheets

(56) References Cited

U.S. PATENT DOCUMENTS

| | | | | |
|---|---|---|---|---|
| 8,417,747 | B1* | 4/2013 | Hayden | G06F 16/9537 707/831 |
| 8,650,657 | B1 | 2/2014 | Shankar et al. | |
| 8,719,590 | B1* | 5/2014 | Faibish | H04L 9/085 713/190 |
| 8,832,466 | B1* | 9/2014 | McGregor, Jr. | H04L 9/0836 713/193 |
| 8,898,402 | B1* | 11/2014 | Stronge | G06F 3/0605 711/100 |
| 8,977,735 | B2* | 3/2015 | Salinas | G06F 9/45558 709/223 |
| 8,977,842 | B1* | 3/2015 | McCorkendale | G06F 21/53 380/285 |
| 9,071,429 | B1 | 6/2015 | Roth et al. | |
| 2003/0002668 | A1 | 1/2003 | Graunke et al. | |
| 2005/0018853 | A1 | 1/2005 | Lain et al. | |
| 2006/0282666 | A1 | 12/2006 | Kim | |
| 2006/0288232 | A1 | 12/2006 | Ho et al. | |
| 2007/0226809 | A1 | 9/2007 | Ellard | |
| 2007/0245410 | A1 | 10/2007 | Perlman et al. | |
| 2008/0256607 | A1 | 10/2008 | Janedittakarn et al. | |
| 2009/0110191 | A1 | 4/2009 | Sanvido et al. | |
| 2011/0158405 | A1 | 6/2011 | Choi et al. | |
| 2011/0283113 | A1 | 11/2011 | Moffat et al. | |
| 2012/0054744 | A1* | 3/2012 | Singh | G06F 21/53 718/1 |
| 2012/0072716 | A1 | 3/2012 | Hu et al. | |
| 2012/0173488 | A1* | 7/2012 | Spielberg | G06F 3/0622 707/639 |
| 2012/0174113 | A1* | 7/2012 | Pohlmann | G06F 9/5088 718/104 |
| 2012/0180039 | A1 | 7/2012 | Bravery et al. | |
| 2012/0284528 | A1 | 11/2012 | Orovitz | |
| 2012/0328105 | A1* | 12/2012 | Mukkara | H04L 9/0897 380/277 |
| 2013/0145006 | A1 | 6/2013 | Tammam | |
| 2013/0305057 | A1 | 11/2013 | Greco et al. | |
| 2013/0322621 | A1 | 12/2013 | Yoon et al. | |
| 2014/0006802 | A1 | 1/2014 | Cachin et al. | |
| 2014/0025963 | A1 | 1/2014 | Subramanian | |
| 2014/0068257 | A1 | 3/2014 | Burckard | |
| 2014/0274408 | A1 | 9/2014 | Dave | |
| 2014/0283010 | A1 | 9/2014 | Rutkowski et al. | |
| 2014/0317618 | A1* | 10/2014 | Behera | G06F 9/455 718/1 |
| 2014/0351605 | A1 | 11/2014 | De Atley et al. | |
| 2014/0359309 | A1 | 12/2014 | Cachin et al. | |
| 2014/0366155 | A1 | 12/2014 | Chang et al. | |
| 2015/0019870 | A1 | 1/2015 | Patnala et al. | |
| 2015/0058861 | A1 | 2/2015 | Zheng et al. | |
| 2015/0074058 | A1 | 3/2015 | Zhao et al. | |
| 2015/0120928 | A1 | 4/2015 | Gummaraju et al. | |
| 2015/0319160 | A1* | 11/2015 | Ferguson | H04L 9/0894 726/10 |
| 2015/0319185 | A1* | 11/2015 | Kirti | H04L 63/1416 726/23 |
| 2016/0342814 | A1* | 11/2016 | Wang | G06F 21/64 |

FOREIGN PATENT DOCUMENTS

| | | |
|---|---|---|
| CN | 104104513 A | 10/2014 |
| EP | 1414181 A1 | 4/2004 |

OTHER PUBLICATIONS sysdig.org, "Universal System Visibility with Native Container Support," 2015, 3 pages.

Encomium to Technology, "Dissecting Docker Security—Part 1," http://goo.gl/35Jr9D, Aug. 12, 2015, 3 pages.

Encomium to Technology, "Aesthetics of Linus Security Modules," http://goo.gl/x12gJD, Aug. 12, 2015, 3 pages.

Netlink, "Linux Programmer's Manual," http://man7.org/linux/man-pages/man7/netlink.7.html, Jan. 10, 2015, 7 pages.

U.S. Appl. No. 14/752,153, filed in the name of R. Wallner et al. on Jun. 26, 2015 and entitled "Coordinated Resource Allocation Between Container Groups and Storage Groups."

U.S. Appl. No. 14/820,026, filed in the name of Vaibhav Khanduja et al. on Aug. 6, 2015 and entitled "Provisioning Isolated Storage Resource Portions for Respective Containers in Multi-Tenant Environments."

U.S. Appl. No. 14/939,562, filed in the name of Vaibhav Khanduja on Nov. 12, 2015 and entitled "Intrusion Detection for Storage Resources Provisioned to Containers in Multi-Tenant Environments."

\* cited by examiner

SECURITY LAYER FOR CONTAINERS IN MULTI-TENANT ENVIRONMENTS

FIELD

The field relates generally to information processing systems, and more particularly to storage resources in information processing systems.

BACKGROUND

Information processing systems increasingly utilize reconfigurable virtual resources to meet changing user needs in an efficient, flexible and cost-effective manner. For example, cloud computing and storage systems implemented using virtual machines have been widely adopted. Other virtual resources now coming into use in information processing systems include Linux containers. Such containers may be used to provide at least a portion of the virtualization infrastructure of a given information processing system. However, significant challenges arise in deployment of containers in multi-tenant environments. For example, in such environments it can be difficult to isolate storage resources utilized by a container of one tenant from the storage resources utilized by containers of other tenants. As a result, private data of a given tenant container may be exposed to containers of other tenants and to an administrative entity of a corresponding container host device.

SUMMARY

Illustrative embodiments provide enhanced security for private data of tenant containers in a multi-tenant environment. For example, some embodiments provide key managers for respective tenants with a given key manager being accessible only to its corresponding tenant and one or more containers of that tenant. The key manager of one tenant is therefore outside of the control of the container host device and is also inaccessible to the other tenants and their containers. Such arrangements can advantageously provide highly secure access of each tenant to its corresponding private data.

In one embodiment, an apparatus comprises at least one container host device implementing containers for respective tenants of a multi-tenant environment. The containers are configured to utilize storage resources of at least one storage platform. A given one of the containers comprises at least one application, and an application file system security layer configured to communicate with the storage platform. The application file system security layer comprises a container storage volume supported by the storage platform, and an encryption engine configured to encrypt and decrypt data of the container storage volume utilizing one or more data encryption keys that are encrypted under a tenant-specific key encryption key. The tenant-specific key encryption key is provided to the application file system security layer by a tenant key manager that is external to the container. The tenant key manager is controlled by the tenant for which the given container is implemented but is outside the control of the container host device and its administrators.

By way of example, at least a portion of a given file of the container storage volume may be encrypted using a particular one of the one or more data encryption keys, with the file further comprising metadata that includes the particular data encryption key encrypted under the tenant-specific key encryption key.

In some embodiments, the given container and one or more encrypted files of its container storage volume are movable from the container host device to another container host device in a manner that preserves access of the application file system security layer to the tenant key manager such that the one or more encrypted files of the container storage volume can be decrypted by the encryption engine subsequent to movement of the given container to the other container host device.

Additionally or alternatively, one or more encrypted files of a container storage volume in some embodiments are movable from a first storage platform to a second storage platform in a manner that preserves access of the application file system security layer to the tenant key manager such that the one or more encrypted files of the container storage volume can be decrypted by the encryption engine subsequent to movement of the one or more encrypted files from the first storage platform to the second storage platform.

Illustrative embodiments can facilitate the use of containers in multi-tenant environments by providing a mechanism through which each tenant can securely access its private data within one or more containers running on a container host device. Such an arrangement can avoid the above-noted difficulties associated with providing isolation of storage resources between multiple tenants, leading to improved security and performance in an information processing system comprising a multi-tenant storage environment.

These and other illustrative embodiments described herein include, without limitation, methods, apparatus, systems, and processor-readable storage media.

DETAILED DESCRIPTION

Illustrative embodiments of the present invention will be described herein with reference to exemplary information processing systems and associated host devices, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as multi-tenant environments.

Figure 1:
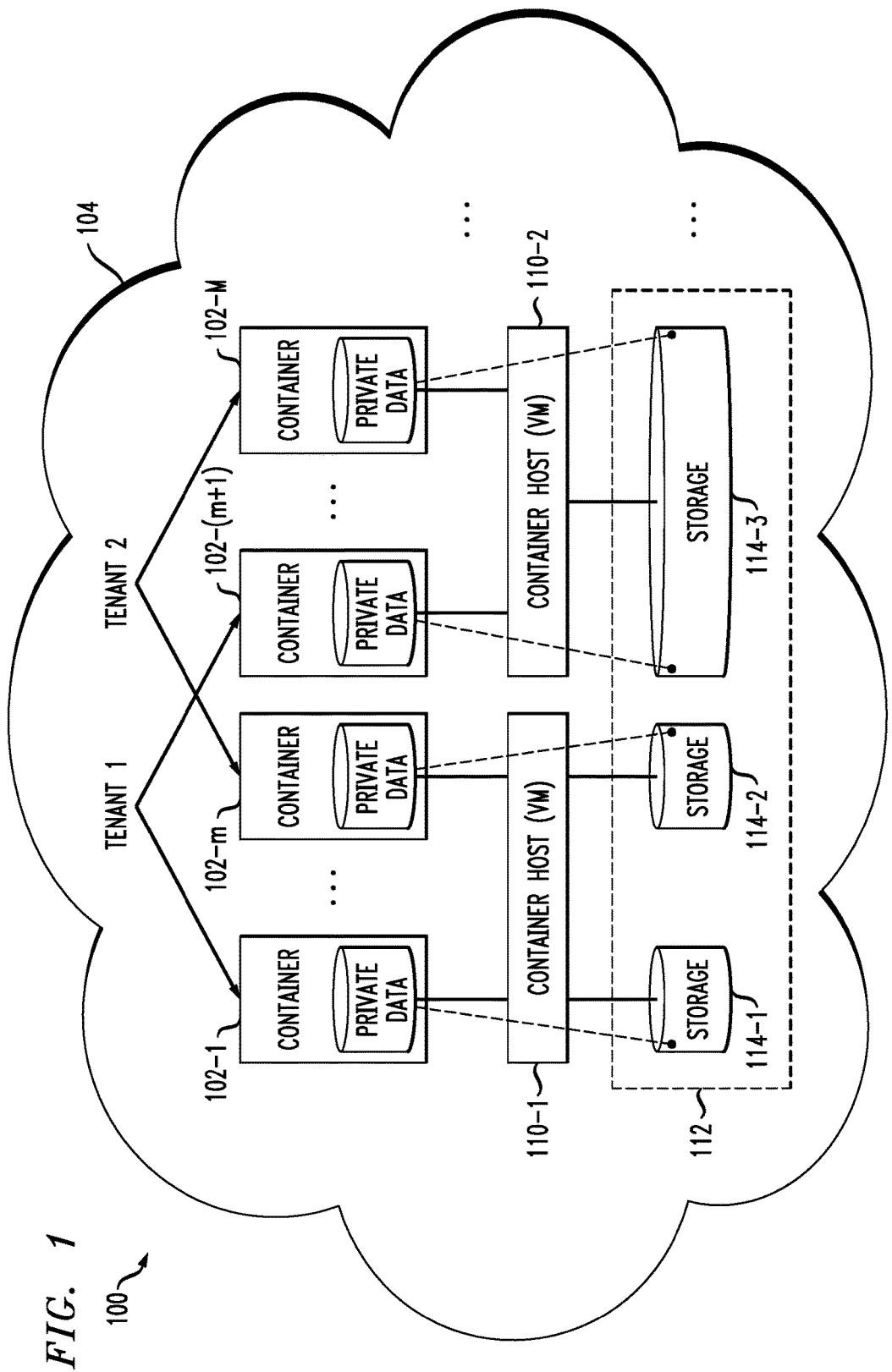
FIG. 1 shows an information processing system configured to provide a security layer for containers of a multi-tenant environment in an illustrative embodiment.

FIG. 1 shows an information processing system 100 configured in accordance with an illustrative embodiment. The system 100 comprises a plurality of containers 102 deployed in a cloud 104. The cloud 104 and other clouds referred to herein illustratively comprise cloud infrastructure including one or more processing platforms. The term "cloud" as used herein is therefore intended to be broadly construed. The containers 102 are individually denoted as containers 102-1, . . . 102-m, 102-(m+1), . . . 102-M. The containers 102 are each associated with a corresponding one of a plurality of tenants of a multi-tenant environment of the system 100. For example, as illustrated in the figure, containers 102-1 and 102-(m+1) are associated with a first tenant denoted Tenant 1, and containers 102-m and 102-M are associated with a second tenant denoted Tenant 2. The system 100 may include additional tenants and associated containers that are not explicitly shown in the figure.

The containers 102 in the FIG. 1 embodiment are implemented by multiple container host devices including at least container host devices 110-1 and 110-2, each comprising at least one virtual machine (VM). Each of these container host devices illustratively comprises at least one processor coupled to a memory and has a host operating system (OS) that illustratively comprises a Linux operating system. Such host devices are examples of what are more generally referred to herein as "processing devices." Container host devices are also referred to herein as respective "hosts."

The containers 102 of the system 100 are illustratively implemented as respective Docker containers or other types of Linux containers (LXCs). The containers 102 are more particularly assumed to be implemented on the container host devices 110 using Linux kernel control groups ("cgroups"). Each of the containers 102 is also assumed to have a unique container namespace identifier assigned by the Linux operating system. It is to be appreciated, however, that embodiments of the present invention are not limited to use with Docker containers or any other particular type of Linux containers and do not necessarily require use of the Linux control group and namespace features.

The containers 102 may be utilized to implement a variety of different types of functionality within the system 100. For example, such containers can be used to implement platform-as-a-service (PaaS) or infrastructure-as-a-service (IaaS) functionality in system 100, as well as microservices or converged infrastructure within a data center or other cloud computing and storage system. More particularly, in the present embodiment, the containers 102 are assumed to comprise respective Docker containers each running one or more applications, with each such container and its associated application(s) corresponding to one of the tenants of the multi-tenant environment of system 100.

In some embodiments, clusters of containers can be managed for one or more tenants across multiple container host devices of the system 100 using container cluster managers such as Docker Swarm or Kubernetes.

In the system 100, each of the containers 102 is assumed to have private data associated therewith as shown. The private data more particularly comprises private data of the corresponding tenant that is utilized by one or more applications running in the container. The private data utilizes underlying storage resources of one or more storage platforms 112. The one or more storage platforms 112 illustratively include distinct storage resources such as storage resources 114-1, 114-2 and 114-3. The container host devices 110 are coupled to the one or more storage platforms 112.

The term "storage platform" as used herein is intended to be broadly construed so as to encompass at least one storage array, at least one storage fabric or a combination of multiple instances of one or more of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

Particular types of storage products that can be used in implementing a given storage platform in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

As additional examples, portions of a given storage platform in some embodiments can comprise converged infrastructure such as VxRack™ or Vblock® converged infrastructure commercially available from VCE, the Virtual Computing Environment Company, an EMC Federation Company.

The private data of each of the containers 102 is assumed to be part of at least one container storage volume supported by the storage platform 112. The container storage volume can be a local file share owned by the container host device or a network file share, network object storage or network block storage owned by the corresponding tenant. The term "container storage volume" as used herein is intended to be broadly construed so as to encompass these and other types of storage resources of a storage platform.

A given container storage volume may be provisioned to the host and then connected to the corresponding container when that container is executing on the host. The container itself comprises at least one process running on the host and may also encapsulate the file system of the container storage volume. That file system and the file systems of respective other containers running on a given container host device may collectively comprise a union file system of the container host device. The container file systems alternatively comprise respective layers of the container host device file system.

Conventional multi-tenant environments are unable to provide adequate isolation of the storage resources utilized by a container of one tenant from the storage resources utilized by containers of other tenants. For example, the above-noted Linux control group and namespace features are unable to ensure complete data isolation for each container. Accordingly, an administrator of the host may be able to obtain access to the private data of all of the containers running on that host. Similarly, containers with high level access privileges may be able to obtain access to the private data of one or more other containers. Also, an exploited or otherwise malicious program running on the host or in another container may be able to obtain access to the private data of a given container. As a result, private data of a given tenant container may be exposed to containers of other tenants and to an administrative entity of the corresponding container host device. Moreover, the likelihood of such attacks tends to increase in a multi-tenant environment.

The FIG. 1 embodiment is advantageously configured to protect the private data of the respective containers 102 by providing a security layer that will be described in more detail below in conjunction with FIGS. 2 and 3. The security layer in these embodiments illustratively prevents even a container host device administrator from accessing the private data of the respective containers. Other system entities including exploited or malicious programs running on the host or in a container as well as containers with high level access privileges are similarly prevented from accessing the private data of other containers. Such an arrangement provides highly secure access of each tenant to its corresponding private data.

Figure 2:
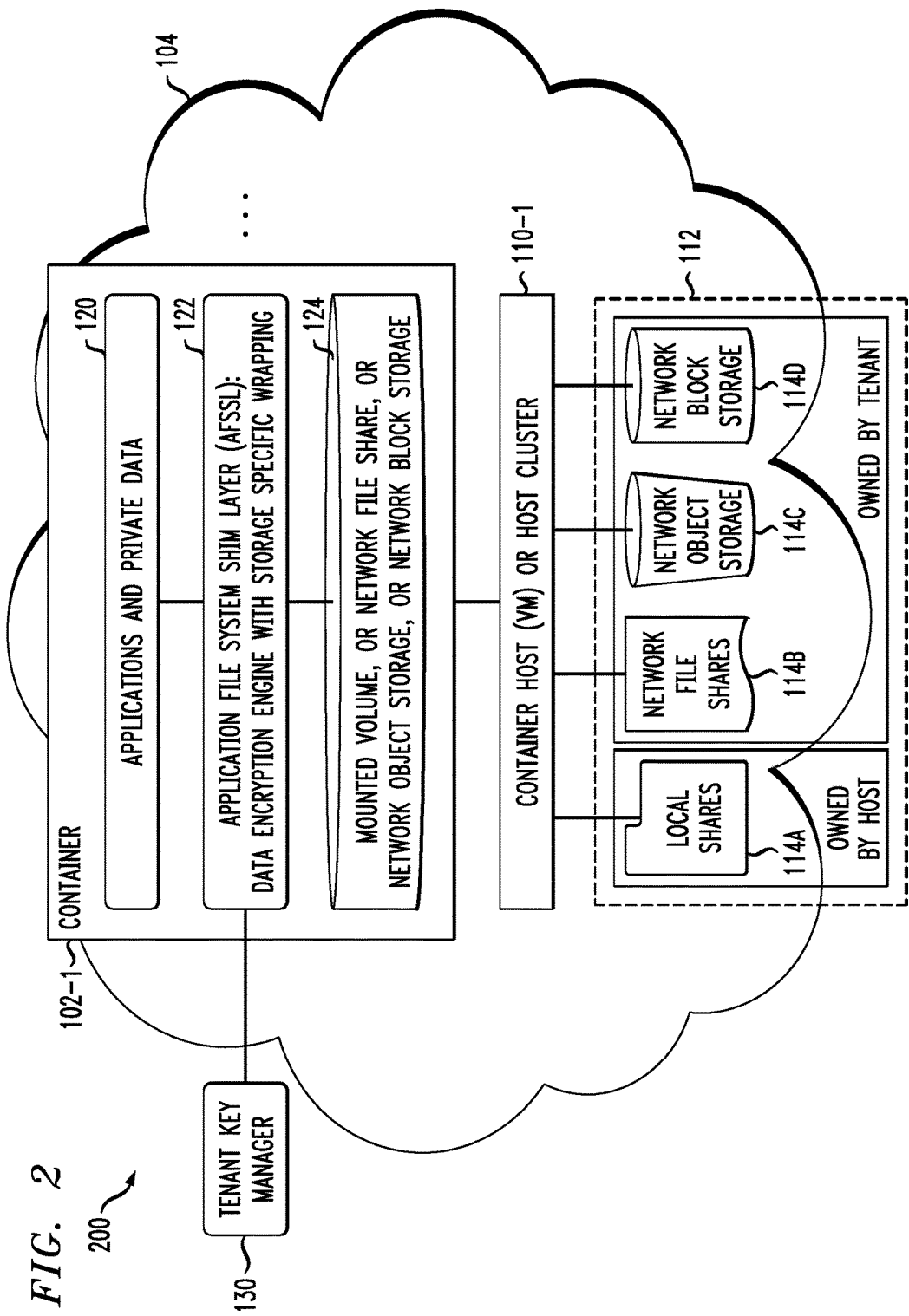
FIGS. 2 and 3 show more detailed views of portions of the information processing system of FIG. 1 in illustrative embodiments.

Referring now to FIG. 2, details of the above-noted security layer in an illustrative embodiment are shown. A portion 200 of the information processing system 100 of FIG. 1 in this embodiment comprises container 102-1 running on container host device 110-1. The container host device 110-1 in some embodiments comprises a virtual machine. Alternatively, the container host device 110-1 may represent a cluster of container host devices, also referred to herein as a "host cluster." The container host device 110-1 implements container 102-1 for a particular tenant of a multi-tenant environment, and also implements one or more additional containers for each of one or more other tenants of the multi-tenant environment.

The containers including container 102-1 are configured to utilize storage resources of one or more storage platforms 112. In this embodiment, the storage platform or storage platforms comprise a local file share 114A that is assumed to be "owned" or otherwise controlled by the container host device, and network file share 114B, network object storage 114C and network block storage 114D each of which is assumed to be "owned" or otherwise controlled by the tenant corresponding to container 102-1. Similar storage resources can be provided for the containers of other tenants. Also, numerous other types and arrangements of storage resources of one or more storage platforms can be used in other embodiments.

The container 102-1 in this embodiment further comprises applications and private data, collectively denoted by reference numeral 120, and an application file system shim layer (AFSSL) denoted by reference numeral 122. The AFSSL 122 is an example of what is more generally referred to herein as an "application file system security layer," and other types of application file system security layers can be used in other embodiments.

The AFSSL 122 is configured to communicate with the storage platform 112. Associated with the AFSSL 122 is a container storage volume 124 supported by the storage platform 112. Although shown as separate from the AFSSL 122 in the figure, the container storage volume 124 is more particularly assumed to be part of that layer, although other arrangements are possible. The container storage volume 124 illustratively comprises one or more of a mounted volume, network file share, network object storage or network block storage provided using respective ones of the storage resources 114A, 114B, 114C and 114D of the storage platform 112. These storage resources in some embodiments are part of respective ones of a plurality of separate storage platforms.

The local file share 114A illustratively comprises a file share from locally-attached storage of the container host device 110-1. The local file share 114A may be either dedicated to the container 102-1 or shared with one or more other containers of the same tenant. The network file shares 114B, network object storage 114C and network block storage 114D are assumed to be owned by the tenant corresponding to container 102-1 and accordingly may be dedicated to the container 102-1 or shared by the container 102-1 and one or more other containers of the same tenant.

The AFSSL 122 incorporates an encryption engine configured to encrypt and decrypt data of the container storage volume 124 utilizing one or more data encryption keys (DEKs) that are encrypted under a tenant-specific key encryption key (KEK) of the corresponding tenant. Such encryption is also referred to in the context of the present embodiment as a "storage specific wrapping" provided by the encryption engine for a particular type of underlying storage resource. Accordingly, different types of encryption or possibly different instances of the encryption engine may be provided for respective different types of underlying storage resources that comprise at least portions of the container storage volume 124.

The tenant-specific KEK is provided to the AFSSL 122 by a tenant key manager 130 that is external to the container 102-1. The tenant key manager 130 in this embodiment is controlled by the tenant for which the container 102-1 is implemented but is outside the control of the container host device 110-1 and its associated administrative entity or entities. It is also inaccessible to the containers of other tenants, regardless of the administrative privilege levels of those containers.

The tenant key manager 130 illustratively stores a plurality of tenant-specific KEKs for its corresponding tenant. It is assumed for this embodiment that each of the tenants of the multi-tenant environment of system 100 is associated with a separate tenant key manager, similar to tenant key manager 130, that is external to each of the one or more containers implemented for that tenant.

In operation, at least a portion of a given file of the container storage volume 124 is encrypted by the encryption engine of the AFSSL 122 using a particular one of the above-noted one or more DEKs. Moreover, the file further comprises metadata that includes the particular DEK encrypted under the tenant-specific KEK.

The AFSSL 122 in this embodiment is referred to as a "shim" layer in that it is inserted between the applications and private data 120 and the underlying storage resources. As noted above, the AFSSL 122 provides a storage specific wrapping for the particular storage resources that are utilized by the container storage volume 124. It can be advantageously configured to accommodate multiple distinct storage types, such as each of the various storage types 114A, 114B, 114C and 114D. The data encryption functionality provided by the AFSSL 122 in such an arrangement may be viewed as being substantially independent of the underlying storage resources. The AFSSL 122 is also transparent in an upward direction to the applications running in the container 102-1. The AFSSL 122 connects to the external tenant key manager 130 of the tenant corresponding to container 102-1 as illustrated in the figure.

Again, other types of application file system security layer configurations may be used in other embodiments. For example, it is possible in some embodiments for the AFSSL 122 to be implemented at least in part within a given one of the one or more applications of the container 102-1.

The AFSSL 122 is configured to communicate with an application programming interface (API) of each of a plurality of file systems of respective storage resources of the underlying storage platform 112. For example, the AFSSL 122 may be configured to directly access a given such file system of the storage platform 112 while bypassing a union file system of the container host device 110-1. In some embodiments, the AFSSL 122 provides secure file folders to one or more applications of the container 102-1. Such secure file folders are inaccessible to containers of other tenants of the multi-tenant environment and to an administrative entity of the container host device. The configuration and operation of the AFSSL 122 may be illustratively carried out at least in part in accordance with one or more policies specified by the corresponding tenant of the associated container 102-1.

The container 102-1 and one or more encrypted files of its container storage volume 124 are movable from the container host device 110-1 to another container host device in a manner that preserves access of the AFSSL 122 to the tenant key manager 130. Accordingly, the one or more encrypted files of the container storage volume 124 can be decrypted by the encryption engine subsequent to movement of the container 102-1 to the other container host device. The movement of the container 102-1 and one or more encrypted files of its container storage volume 124 from the container host device 110-1 to another container host device is illustratively controlled responsive to one or more tenant-specified trigger conditions. For example, the one or more tenant-specified trigger conditions may include at least one trigger condition based at least in part on detection of a current location of a corresponding tenant device. Numerous other types of tenant-specified trigger conditions or other trigger conditions that are not necessarily tenant specified may be used.

Additionally or alternatively, one or more encrypted files of the container storage volume 124 are movable from a first storage platform to a second storage platform in a manner that preserves access of the AFSSL 122 to the tenant key manager 130. Accordingly, the one or more encrypted files of the container storage volume 124 can be decrypted by the encryption engine subsequent to movement of the one or more encrypted files from the first storage platform to the second storage platform. As in the case of the above-described movement of the container and its one or more encrypted files, movement of just the one or more encrypted files from one storage platform to another can be controlled responsive to one or more tenant-specified trigger conditions, including at least one trigger condition based at least in part on detection of a current location of a corresponding tenant device.

Figure 3:
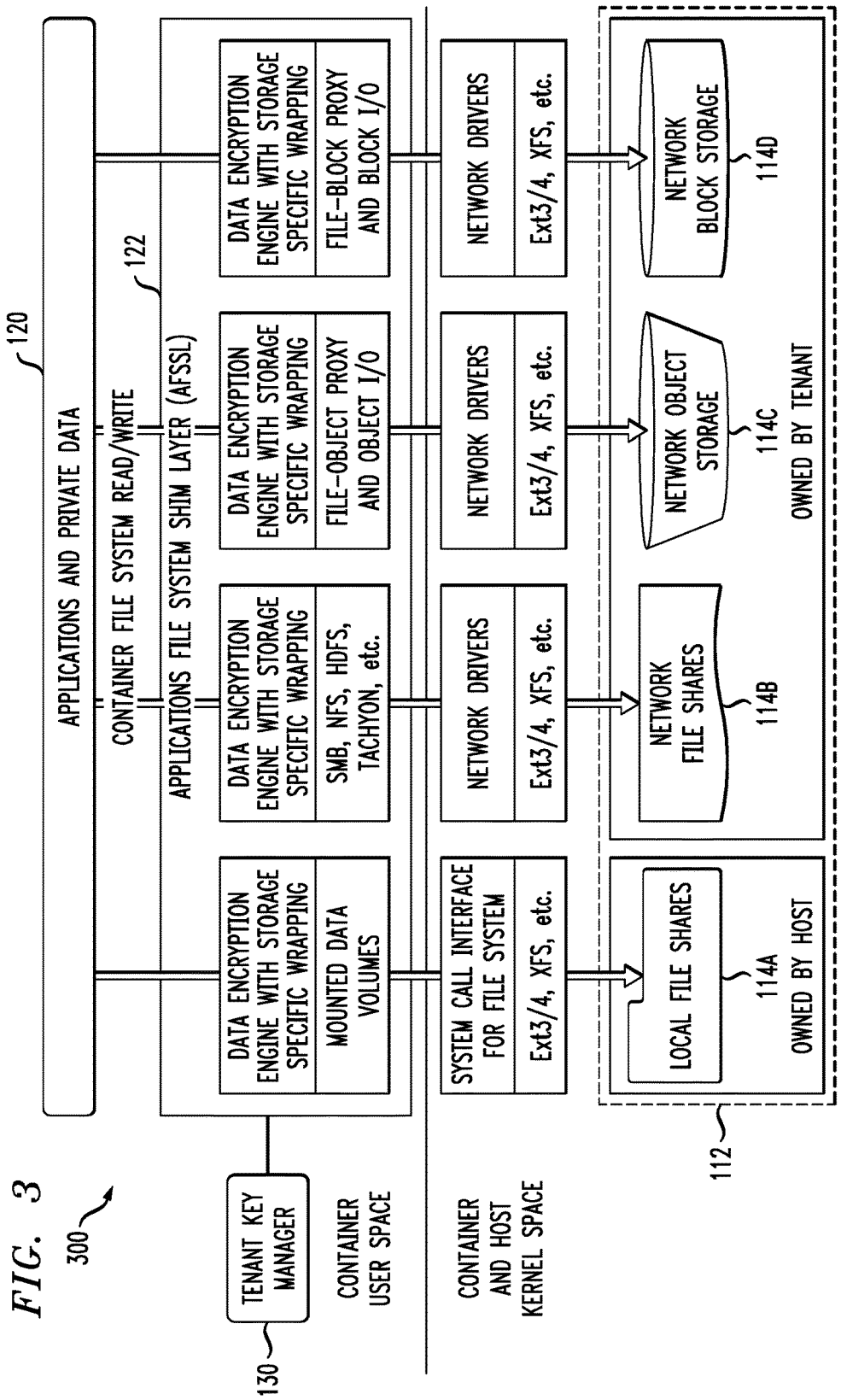

FIG. 3 shows a more detailed view of the AFSSL 122 and its interaction with the underlying storage resources. In the portion 300 of system 100 that is shown in this figure, the AFSSL 122 is coupled to the applications and private data 120 of the corresponding container 102-1 via a container file system read/write interface as illustrated. The AFSSL 122 and tenant key manager 130 are illustratively within container user space. The AFSSL 122 in this embodiment supports each of the different types of storage resources 114A, 114B, 114C and 114D, and includes a separate instance of the data encryption engine with a different storage specific wrapping for each storage type.

For the local file shares 114A, the AFSSL 122 includes mounted data volumes and communicates via a system call interface with a corresponding file system, which may comprise an Ext3, Ext4 or XFS file system.

For the network file shares 114B, the AFSSL 122 includes modules for respective instances of server message block (SMB) protocol, network file system (NFS), Hadoop distributed file system (HDFS), Tachyon and possibly others. These modules communicate via network drivers with the network file shares 114B.

For the network object storage 114C, the AFSSL 122 includes a file-object proxy and a corresponding object input/output (I/O) module that communicates via network drivers with the network object storage 114C.

For the network block storage 114D, the AFSSL 122 includes a file-block proxy and a corresponding block I/O module that communicates via network drivers with the network block storage 114D.

Each instance of the data encryption engine in the AFSSL 122 performs file-based data encryption and decryption at the corresponding file system API. The data encryption in this embodiment is considered "mobile" in the sense that when encrypted data moves from container to container or from platform to platform, information necessary to decrypt the encrypted data, and in particular the necessary key material, is contained in metadata in each file header. As noted above, the DEK that was used to encrypt the data is encrypted under the tenant-specific KEK and the resulting encrypted DEK is part of the file metadata. The KEK is stored in the key manager 130 of the corresponding tenant, and a separate such key manager is assumed to be provided for each of the tenants in the present embodiment. It should be noted that a given one of the tenants can have multiple KEKs, with each such KEK being used to encrypt one or more DEKs that are used to encrypt multiple files. As indicated previously, the encrypted files can be moved across containers and hosts as well as storage platforms and are still accessible by tenant applications running in the container as long as those tenant applications and the corresponding container can access the tenant key manager 130.

In the present embodiment, storage access via the AFSSL 120 relating to private data of the container 102-1 will bypass the union file system of the container host device 110-1, where the union file system represents a combination of file systems of the containers supported by that container host device. As a result, the data encrypted by the AFSSL 122 is independent of the union file system of the container host device, and persists even after the container is from that container host device to another container host device. From the point of view of the container host device, the AFSSL 122 appears to be an internal part of a process or application of the container 102-1. The AFSSL 122 presents secure file folders to the applications, and the applications access the AFSSL 122 in exactly the same manner as they access the normal file folders of their file system.

The AFSSL 122 has interfaces with the tenant key manager 130, the container applications 120 and with the different storage resources 114A, 114B, 114C and 114D. Table 1 below shows examples of AFSSL interface configurations that may be utilized in illustrative embodiments. It is to be appreciated that these particular interfaces, and their associated protocols, APIs, access control mechanisms and other features, are presented by way of example only, and should not be viewed as limiting in any way.

TABLE 1

Example AFSSL Interfaces

| Interface | Protocol & API | Access Control | Security |
|---|---|---|---|
| Tenant Key Manager | Socket calls over SSL or HTTPS | Certificate based authentication | Encrypted messages |

TABLE 1-continued

Example AFSSL Interfaces

| Interface | | Protocol & API | Access Control | Security |
|---|---|---|---|---|
| Container Applications | | Normal file access on file folders | Process based file access control | Clear text files |
| Storage | Local share | File system calls on mapped volumes | Process based file access control | Encrypted files |
| | Network File Share | File system calls over NFS/SMB shares | Process based file access control | Encrypted files |
| | Network Objects | Socket calls over HTTP | Certificate based authentication | Encrypted objects |
| | Network Block Device | SCSI calls over iSCSI | Certificate based authentication | Encrypted blocks |

The AFSSL 122 in the present embodiment advantageously serves to completely isolate container private data from the host and other containers. The AFSSL in providing this isolation of the container private data automatically bypasses the container host union file system and directly accesses the storage resources. The container private data is encrypted in accordance with tenant-controlled keys and policies. The AFSSL 122 may be viewed as providing a secure tunnel between the container private data and the underlying storage resources of the storage platform such that the container host device and the other containers cannot access an unencrypted version of the container private data.

The AFSSL 122 connects to the external tenant key manager 130 directly and securely on behalf on the corresponding tenant. The authentication of the AFSSL 122 to the tenant key manager 130 utilizes a tenant certificate and is therefore independent of the container host device and the other containers. Data isolation and security mobility are provided across different hosts in the same cloud or across multiple different clouds, as the tenant key manager is under the exclusive control of the corresponding tenant.

In addition, the AFSSL 122 supports multiple different types of underlying storage resources, including in the present embodiment local file shares, network file shares, network object storage and network block storage. Other types and combinations of storage resources can be supported in other embodiments.

The AFSSL 122 can be installed, for example, as part of a container image, part of one or more applications, or as an internal tool of the container. Numerous other configurations of the AFSSL 122 or more generally application file system security layers are possible in other embodiments. In some embodiments, the AFSSL 122 is under tenant security policy control and its operation is triggered automatically at the start of the container, at the start of one or more of the applications of the container, or during the execution of one or more of those applications. The installation, activation and execution of the AFSSL 122 is dynamic and flexible, and can be made independent of applications, containers and container hosts. In some embodiments, the functionality of the AFSSL 122 is provided as a Security-as-a-Service option to customers of PaaS, IaaS or other cloud services.

Accordingly, it is to be appreciated that the particular arrangements of system elements shown in FIGS. 1 through 3 are for purposes of illustration only. Numerous alternative system configurations, involving other arrangements of additional or alternative elements, can therefore be used to implement security functionality for containers of respective tenants in a multi-tenant environment.

The operation of an illustrative embodiment of an information processing system will now be described in further detail with reference to the flow diagram of FIG. 4. The process as shown includes steps 400 through 404, and is suitable for use in the system 100 but is more generally applicable to other systems that include a security layer for containers in a multi-tenant environment. Accordingly, references to particular components of the FIG. 1 embodiment in the process description below should not be viewed as limiting in any way, as the disclosed process steps can be applied in other information processing systems, including at least a subset of the example information processing systems to be described below in conjunction with FIGS. 5 through 10.

In step 400, containers are implemented for respective tenants of a multi-tenant environment on at least one container host device. In the context of the FIG. 1 embodiment, the containers 102 are assumed to comprise respective Docker containers or other types of LXCs. The containers 102 may be implemented at least in part utilizing a Docker daemon or other similar container generating program.

In step 402, the containers are configured to utilize storage resources of at least one storage platform. These storage resources provide for each of the containers at least one container storage volume. The storage resources are illustratively part of one or more storage platforms, such as the storage platform 112 comprising local file shares 114A, network file shares 114B, network object storage 114C and network block storage 114D as illustrated in FIGS. 2 and 3. Examples of container storage volumes include not only mounted data volumes but also other types of storage volumes supported by one or more underlying storage resources for the use of a given container. Accordingly, the term "container storage volume" as used herein is intended to be broadly construed.

In step 404, for a given one of the containers, data of the container storage volume is encrypted and decrypted utilizing one or more data encryption keys or DEKs that are encrypted under a tenant-specific key encryption key or KEK. The tenant-specific KEK is provided by a tenant key manager such as tenant key manager 130 in FIGS. 2 and 3 that is external to the given container and controlled by the corresponding tenant. For example, at least a portion of a given file of the container storage volume is encrypted using a particular one of the one or more DEKs and the file is configured to comprise metadata that includes the particular DEK encrypted under the tenant-specific KEK. Other types of encryption and decryption operations can be provided in other embodiments.

Figure 4:
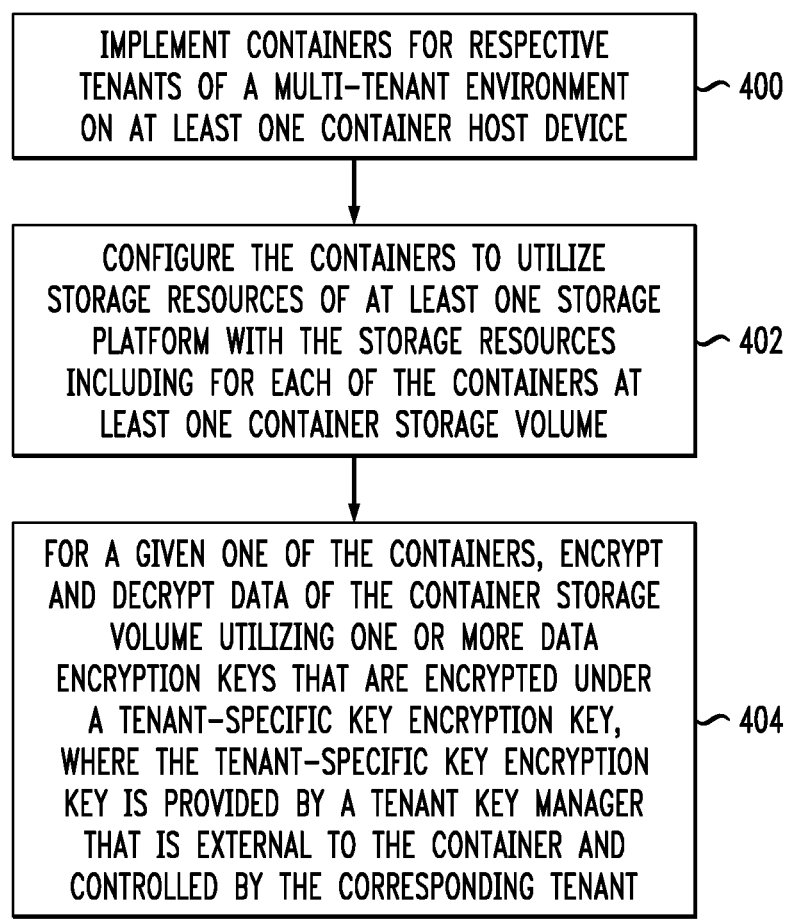
FIG. 4 is a flow diagram of a process for providing secure access to container data in an illustrative embodiment.

The implementation of the FIG. 4 process in some embodiments utilizes an application file system security layer, such as the AFSSL 122 previously described, although other security arrangements are possible in other embodiments.

As mentioned above, the given container and one or more encrypted files of its container storage volume are movable from the container host device to another container host device in a manner that preserves access of an application file system security layer to the tenant key manager such that the one or more encrypted files of the container storage volume can be decrypted by the encryption engine subsequent to movement of the given container to the other container host device. Such movement is illustratively controlled responsive to one or more tenant-specified trigger conditions. An example of such a trigger condition is detection of a current location of a corresponding tenant device.

It is also possible for one or more encrypted files of a container storage volume to be moved from a first storage platform to a second storage platform in a manner that preserves access of the application file system security layer to the tenant key manager such that the one or more encrypted files of the container storage volume can be decrypted by the encryption engine subsequent to the movement of the one or more encrypted files from the first storage platform to the second storage platform. As in the case of movement of the container, movement of the one or more encrypted files can be controlled responsive to one or more tenant-specified trigger conditions.

The particular processing operations and other system functionality described in conjunction with the flow diagram of FIG. 4 are presented by way of illustrative example only, and should not be construed as limiting the scope of the invention in any way. Alternative embodiments can use other types of processing operations to provide security functionality for tenant containers of a multi-tenant environment. For example, the ordering of the process steps may be varied in other embodiments, or certain steps may be performed concurrently with one another rather than serially. Also, one or more of the process steps may be repeated periodically for different processing scenarios, or performed in parallel with one another. For example, parallel instantiations of one or more of the process steps can be implemented for different containers of respective tenants within the system.

Container security functionality such as that described in conjunction with the flow diagram of FIG. 4 can be implemented at least in part in the form of one or more software programs stored in memory and executed by a processor of a processing device such as a computer or server. For example, an application file system security layer is illustratively implemented as one or more software programs configured to run in a corresponding container. As will be described below, a memory or other storage device having executable program code of one or more software programs embodied therein is an example of what is more generally referred to herein as a "processor-readable storage medium."

Additional illustrative embodiments of example information processing systems implementing storage intrusion detection functionality will now be described with reference to FIGS. 5 through 7. In these embodiments, each of the systems comprises one or more containers that implement respective application file system security layers, such as the AFSSLs previously described.

Figure 5:
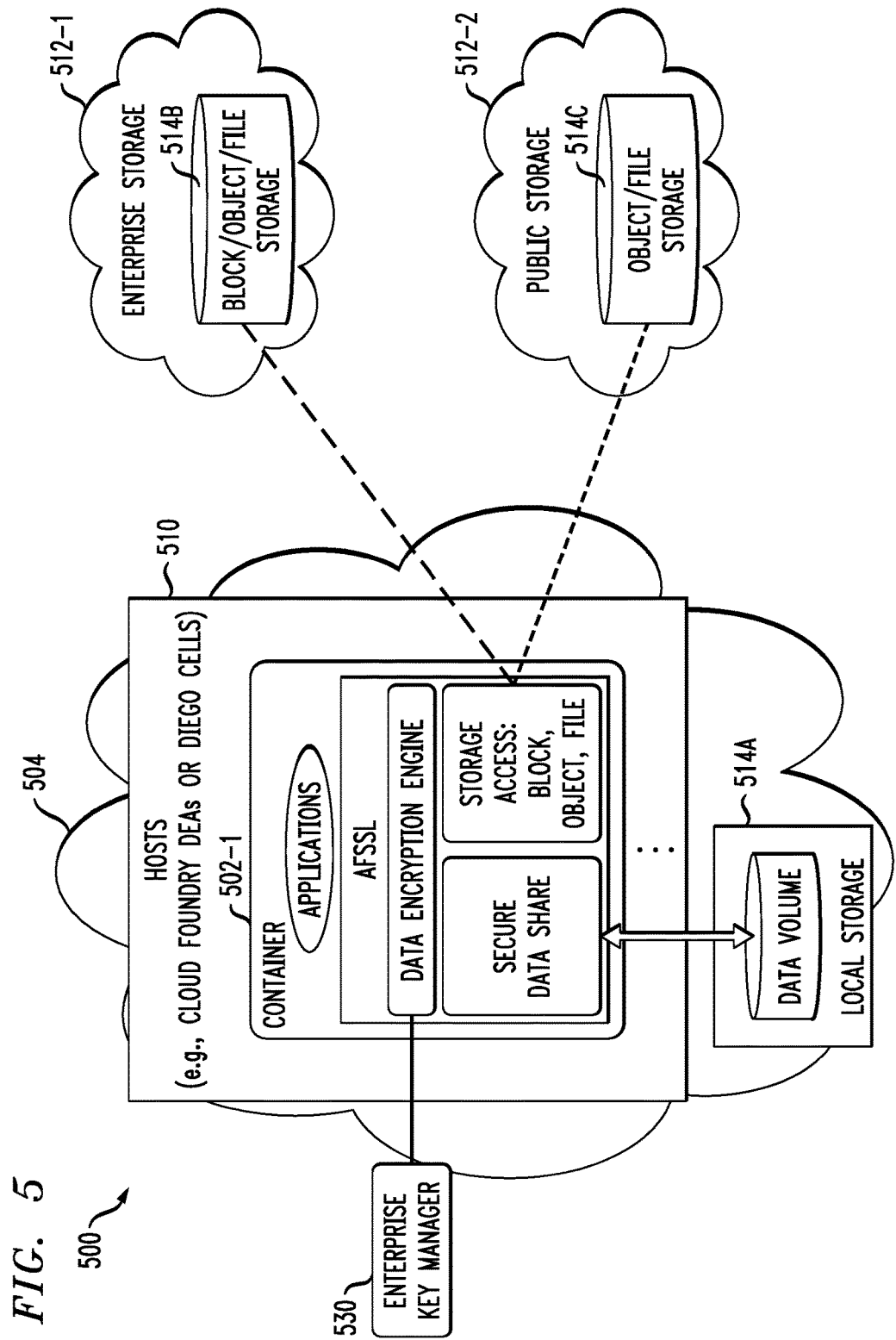
FIGS. 5, 6 and 7 illustrate information processing system providing security layers for containers of multi-tenant environments in other embodiments.

Referring now to FIG. 5, an information processing system 500 comprises a container 502-1 implemented in a cloud 504. The container 502-1 is assumed to be associated with a particular tenant of the cloud 504. The cloud 504 in this embodiment is part of an enterprise hybrid cloud that includes a plurality of hosts 510 and utilizes both cloud-based enterprise storage 512-1 and cloud-based public storage 512-2. By way of example, the hosts 510 may comprise Cloud Foundry® Droplet Execution Agents (DEAs) or Diego Cells, although numerous other host configurations could be used.

The container 502-1 is one of a plurality of containers implemented using the hosts 510. Such containers can be utilized for application development, code and data pipeline management, or simply data processing and storage. The data processed by the containers can be stored on local storage 514A of the hosts 110. Additionally or alternatively, data processed by the containers can be stored on block, object or file storage 514B of the enterprise storage 512-1, or on object or file storage 514C of the public storage 512-2.

Privacy is provided for such data relative to the hosts 510 and other containers by an AFSSL deployed in the container 502-1 and configured substantially as previously described in conjunction with FIGS. 2 and 3. The AFSSL in this embodiment comprises a data encryption engine that interacts with an enterprise key manager 530. The AFSSL provides a secure data share for the container applications to a data volume of the local storage 514A, and also provides the container applications with secure storage access to blocks, objects or files stored in the storage resources 514B and 514C of the respective cloud-based enterprise and public storage 512-1 and 512-2.

The data volume of the local storage 514A is persistent even if the container 502-1 is deleted, and can be shared and reused among containers of the same tenant. The corresponding data remains encrypted and protected against host administrators and other programs on the host during the data volume life cycle. The public storage 512-2 is typically always multi-tenant, and the enterprise storage 512-1 could be multi-tenant among multiple departments. The AFSSL ensures that any private data of a given tenant container stored in these storage resources will be protected from the hosts and other containers. An example of a possible use case for this embodiment is as a Cloud Foundry® Caspian Service.

Figure 6:
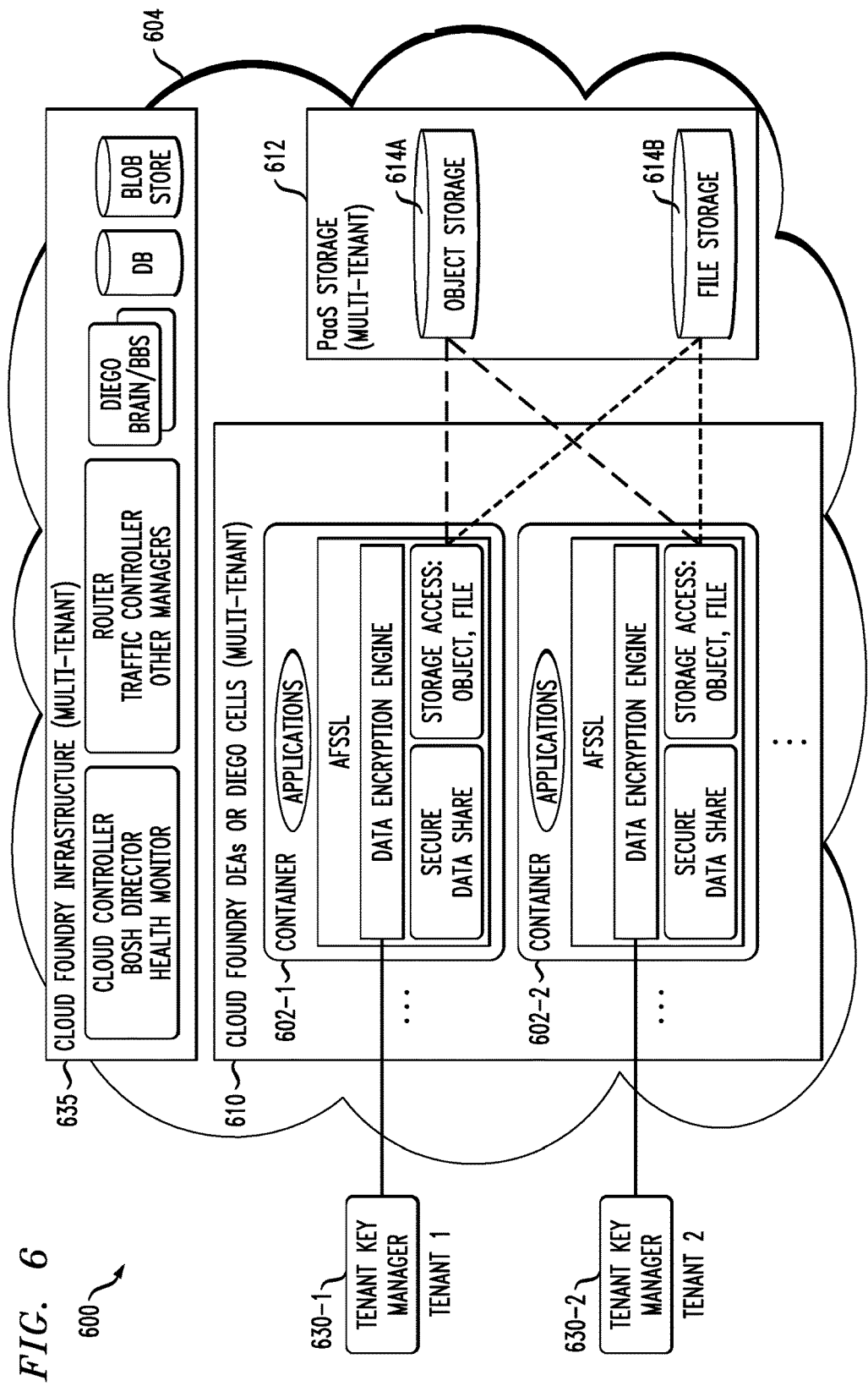

Another illustrative embodiment is shown in FIG. 6. In this embodiment, an information processing system comprises a plurality of containers, including containers 602-1 and 602-1, implemented in a cloud 604. The containers 602 run on hosts 610 that again illustratively comprise Cloud Foundry® DEAs or Diego Cells. It is also again assumed that the hosts provide containers for multiple tenants. Each of the containers 602 comprises an AFSSL configured in a manner similar to the AFSSL of FIG. 5. Each of the containers 602 via its corresponding AFSSL accesses multi-tenant PaaS storage resources 612 including object storage 614A and file storage 614B, but in this embodiment does not access any local storage of the hosts 610.

The containers 602-1 and 602-2 in this embodiment are controlled by respective tenants denoted Tenant 1 and Tenant 2. The data encryption engines in their respective AFSSLs communicate with respective tenant key managers 630-1 and 630-2. Each of the tenants is assumed to have multiple containers running on the hosts 610 to support their respective applications.

The containers 602 also access other multi-tenant Cloud Foundry® infrastructure 635, illustratively comprising a cloud controller, BOSH director, health monitor, router, traffic controller, other managers, Diego Brain/BBS ("bulletin board system"), a database (DB) and a binary large object ("blob") store. These infrastructure components and other components of the FIG. 6 embodiment are presented by way of illustrative example only, and other types and arrangements of components can be used in other embodiments.

The AFSSLs of the respective distinct tenant containers 602 are advantageously configured to isolate the private data of the respective tenants from the host administrators as well as from other containers that can access the container hosts 610, the multi-tenant PaaS storage 612 or the multi-tenant infrastructure 635.

Figure 7:
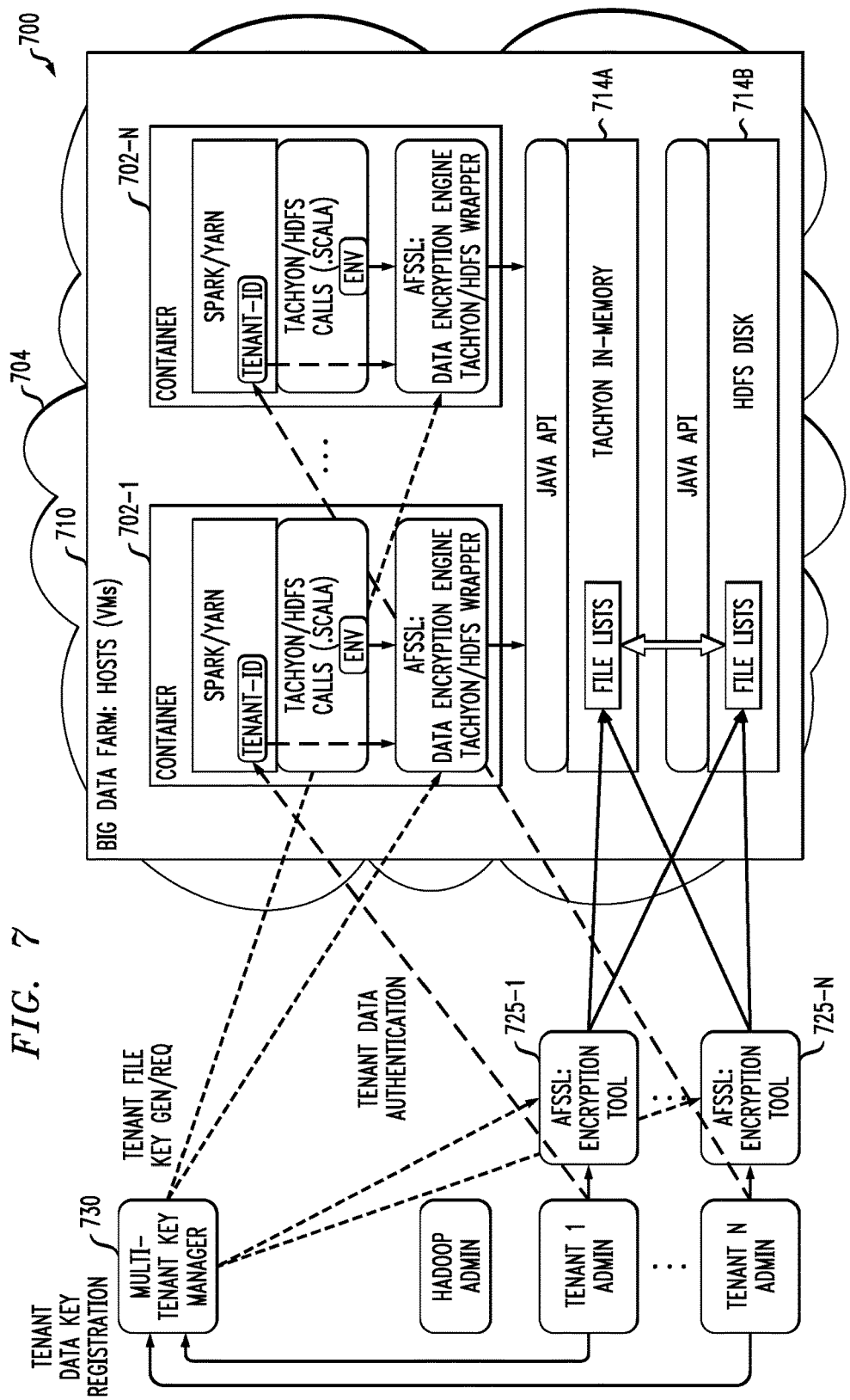

FIG. 7 shows another illustrative embodiment, particularly adapted for an example Big Data context. In this embodiment, an information processing system 700 comprises containers 702-1 through 702-N running in a cloud 704. The containers 702 run on container hosts 710. The hosts 710 in this embodiment are part of a Big Data "farm" and illustratively comprise respective virtual machines or VMs. The containers 702-1 through 702-N are assumed to be controlled by different tenants, denoted Tenant 1 through Tenant N.

The containers 702-1 through 702-N include respective Spark/Yarn analytics applications having respective tenant identifiers ("tenant-id") as shown. The storage resources utilized by these containers include a Tachyon in-memory database 714A and disk-based storage of a Hadoop Distributed File System (HDFS) 714B. The Spark/Yarn analytics applications access the storage resources via Tachyon/HDFS system calls, illustratively in the Scala programming language (.scala). This configuration also illustratively involves use of an environmental (ENV) variable script. Each of the containers 702-1 through 702-N includes an AFSSL arranged between the Spark/Yarn applications and the underlying Tachyon and HDFS storage resources. The AFSSLs each provide a data encryption engine having a Tachyon/HDFS wrapper configured to support the Tachyon and HDFS storage resources.

Each of the N tenants of the system 700 has an associated tenant administrator as illustrated. In addition, each tenant administrator is associated with a corresponding one of a plurality of AFSSL encryption tools 725-1 through 725-N. For example, tenant administrators for Tenant 1 and Tenant 2 are associated with respective AFSSL encryption tools 725-1 and 725-N. There is also a Hadoop administrator that coordinates analytics operations of the various tenants in performing Big Data analytics as a service in system 700.

The system 700 comprises a multi-tenant key manager 730. Each of the tenant administrators registers a corresponding tenant key with the multi-tenant key manager 730. In addition, the AFSSLs in the respective containers 702 authenticate to the multi-tenant key manager 730 in a manner similar to that described elsewhere herein.

In providing Big Data analytics as a service, system 700 utilizes both data and applications of multiple tenants. The AFSSL components of the system 700 are configured to provide isolation of the data and applications of each tenant from the container hosts and the other tenants at both data input and data output, as well as during data processing as the applications execute in the containers. More particularly, tenant-specific data encryption is used to provide tenant data isolation and exclusive access. Data is encrypted before entering the Big Data farm using the AFSSL encryption tools 725 and the data privacy is maintained during the data life cycle in the Big Data farm using the AFSSLs of the respective containers 702. The binding of the data and the DEK of a particular tenant is under the control of that tenant and independent from the other tenants and their containers.

Several other illustrative embodiments will now be described with reference to FIGS. 8 through 10. One or more of these illustrative embodiments utilize minimalist container file systems that can store metadata. Such container file systems can be encrypted, stored, exported or transported within a given information processing system, possibly in response to one or more predefined event triggers. Such triggers can be based at least in part on information obtained from Internet of Things devices, social media, data analytics, machine learning or other sources of event trigger information.

Figure 8:
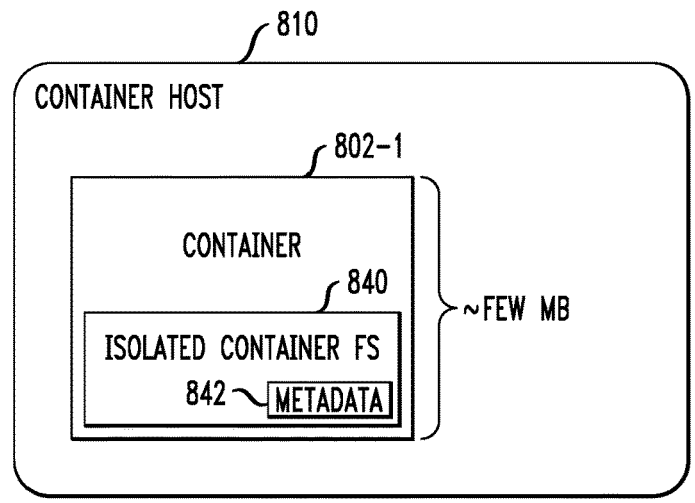
FIG. 8 shows another example of a container configuration in an illustrative embodiment.

An example of a system configured in this manner is shown in FIG. 8. In this embodiment, a container host device 810 implements a container 802-1 that runs on that host. The container 802-1, which illustratively has a size of approximately a few MegaBytes (MB), includes an isolated container file system or FS 840 that includes metadata 842.

In some implementations of the FIG. 8 embodiment, the metadata 842 comprises at least one data encryption key or DEK encrypted under a tenant-specific key encryption key or KEK in the manner previously described. However, numerous other types of metadata may be used in other embodiments.

The container 802-1 in some embodiments is configured to purposely store state information inside of its isolated file system 840. The container can be snapshotted or saved in a secure manner using encryption so it can easily be transported and started in another location with the same metadata 842 in its isolated file system 840. The use of encryption in this embodiment provides a security layer within the container that serves to isolate the container when it is started in the other location.

As noted above, the container 802-1 in the present embodiment has a relatively small size on the order of a few MB. Such a container may comprise, for example, a "scratch" container or other type of minimal container. However, containers of other types and sizes can be used in other embodiments. For example, in some embodiments, containers of even smaller sizes on the order of kilobytes (KB) may be used.

Due to its relatively small size in this embodiment, the container 802-1 can be easily transported from cloud to cloud, telecommunication system to telecommunication system or from wireless endpoint to wireless endpoint. There is no need to set up a dedicated compute environment to run such a container. Instead, events will trigger movement of the container and an associated routing process will locate an available compute environment closest to the location at which the container is needed. For example, as will be described in more detail below in conjunction with FIG. 10, the location at which the container is needed may be a hospital or other medical office to be visited by a given patient that stores a portion of his or her sensitive medical data within the container. Moreover, the container and its sensitive medical data can leave that location with the patient at the end of his or her visit.

As noted above, a wide variety of different types of information may be taken account in triggering movement of a given container from one location to another. For example, information relating to social media or other types of web-based platforms can trigger container movement and possible identification of transport mechanism and endpoint. Possible events that can be detected in such arrangements include a user announcing on a social media platform such as Twitter, Facebook or Instagram that he or she is going on vacation, or a corporate user booking a trip to a conference at which that user is presenting a research paper. Identification of such events can lead to the performance of data analytics to understand the context of the trip. Based on the learned context, the container and its associated data can be migrated to an available compute environment closest to the endpoint of the trip. For example, a hotel at the endpoint might deploy infrastructure to support such containers or a new region of a cloud service provider could be selected as the destination for the container.

Figure 9:
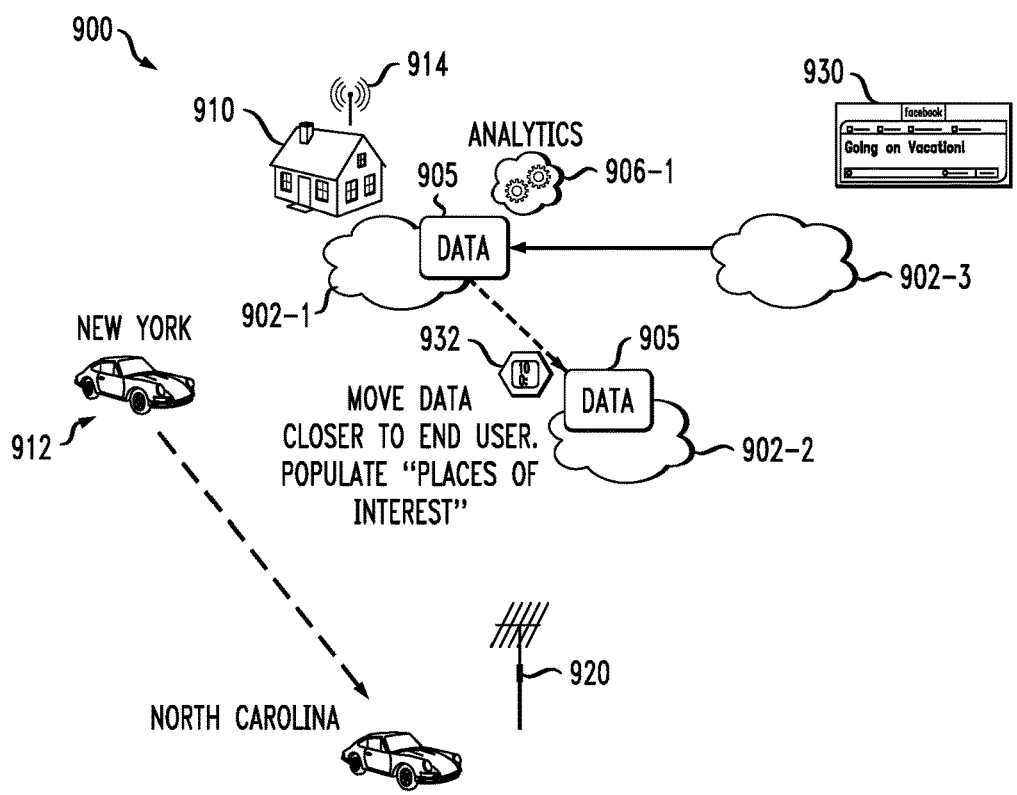
FIGS. 9 and 10 show examples of information processing systems in which container data is securely moved from one container host device to another within the system responsive to one or more tenant-specified trigger conditions.
Figure 10:
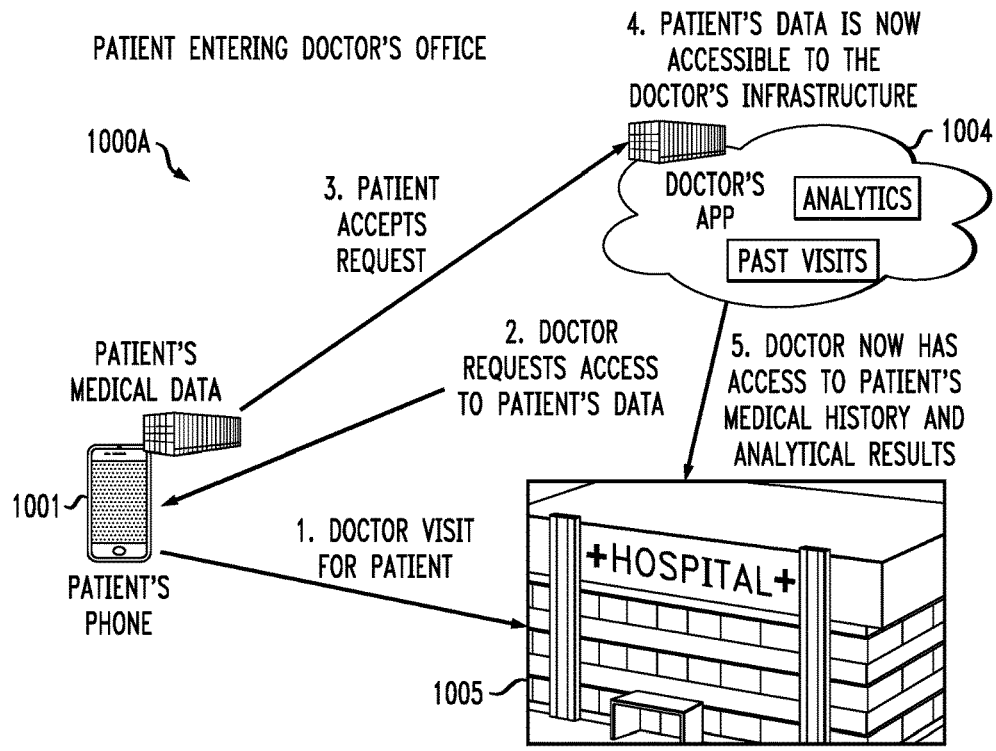
Figure 10:
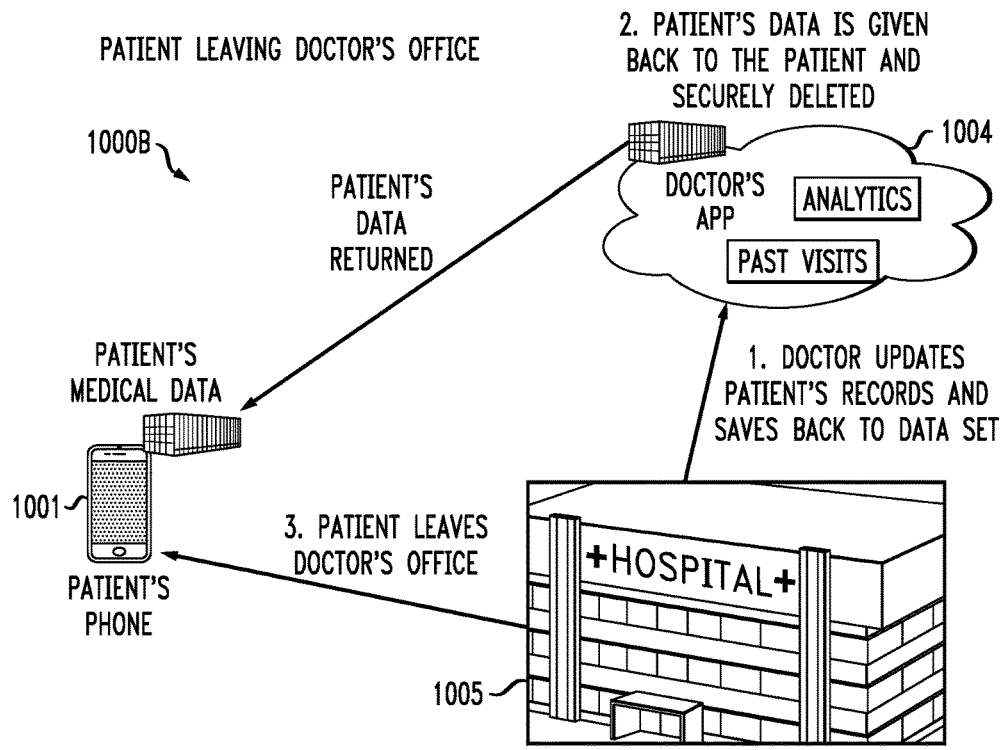

Referring now to FIG. 9, an information processing system 900 is configured to permit movement of containers responsive to triggering events in the manner described above. In this embodiment, a given container and one or more encrypted files of its isolated container file system is moved from a container host device in one location to another container host device in a different location. The movement is responsive to one or more tenant-specified trigger conditions including at least one trigger condition that is based at least in part on detection of a current location of a corresponding tenant device.

In this embodiment, it is assumed that the container provides JED ("Just Enough Data") needed to support a given application. Accordingly, the container is a relatively small container, like the container 802-1 of FIG. 8. Such a container is also referred to herein as a "lightweight" container.

The system 900 comprises three distinct network portions 902-1, 902-2 and 902-3, each assumed to be associated with a different geographic location. The first network portion 902-1 is a network portion in proximity to a home location 910 of an end user 912 in New York. The home location 910 is equipped with a wireless network 914 through which the end user 912 accesses the network portion 902-1 when in New York. At this location, the end user 912 can access, for example, a social media web site served from the third network portion 902-3. The access of the end user 912 is via a mobile device of that user, although other types of user devices could be utilized in other embodiments. The end user 912 in this example may be viewed as a tenant of a service provider that provides at least a subset of the first, second and third network portions 902-1, 902-2 and 902-3.

It is assumed in this embodiment that the end user 912 takes a vacation to North Carolina. At this vacation location, the end user 912 accesses the second network portion 902-2 via a base station 920 of a telecommunication service provider. Prior to or in conjunction with his or her travel from New York to North Carolina, the end user 912 posts a message 930 on the social media web site associated with third network portion 902-3. The message 930 states that the end user is "going on vacation."

Data 905 associated with the end user 912 is assumed to be encrypted within an isolated container file system of a container executing on a container host device in the network portion 902-1. An analytics component 906-1 is also executing in the network portion 902-1. The analytics component 906-1 detects that the end user 912 has posted the "going on vacation" message 930 on the social media web site, and determines a likely endpoint. The network portions 902-1 and 902-2 and the analytics component 906-1 collectively detect that a mobile device associated with the end user 912 has traveled from New York to North Carolina. This triggers movement of the container containing encrypted data 905 from the network portion 902-1 in New York to the network portion 902-2 in North Carolina.

Movement of the data 905 in some embodiments can utilize a Virtual Network Storage Function (VNSF) layer and associated VNSF instances of the type disclosed in U.S. patent application Ser. No. 14/575,080, filed Dec. 18, 2014 and entitled "Virtual Network Storage Function Layer Comprising one or more Virtual Network Storage Function Instances," which is commonly assigned herewith and incorporated by reference herein.

For example, a VNSF layer can be implemented in the system 900 as a network virtualization overlay on top of an IP backbone or other network portions of one or more service providers. The VNSF layer can migrate the data and associated metadata using a routing protocol that determines which VNSF instance of the VNSF layer is closest to a determined current geographic location of the end user. In the context of the FIG. 9 embodiment, this routing protocol may receive as its input the latitude and longitude coordinates of the mobile device of the end user 912, and determines that a VNSF instance associated with the network portion 902-2 is closest to the end user 912 in North Carolina. It is to be appreciated, however, that use of such VNSF layers and instances is not a requirement of embodiments of the present invention, and a variety of other techniques can be used to control movement of the container that contains the encrypted data 905 of the end user 912.

The container that includes encrypted data 905 is migrated from network portion 902-1 to network portion 902-2 as indicated generally by reference numeral 932 so as to be close as possible to the current geographic location of the end user 912 in North Carolina. Also included in the migrated container is the relevant metadata, which in some embodiments can include a data encryption key encrypted using a tenant-specific key encryption key controlled by the end user 912. For example, the container that includes the encrypted data 905 after its movement from the first network portion 902-1 to the second network portion 902-1 can access a tenant key manager to allow the container to obtain the tenant-specific key encryption key needed to decrypt the data encryption key. The decrypted data encryption key is then used to decrypt the encrypted data 905 so as to permit its use at the new location. Numerous other encryption arrangements are possible in other embodiments.

In the system 900, the container comprising the encrypted data 905 provides mobile JED capability for the end user 912 in conjunction with his or her travel from New York to North Carolina.

Similar container security functionality can be provided in numerous other contexts, possibly involving secure routing of IoT data and other types of sensitive data. For example, another such context includes routing of sensitive patient data in conjunction with visit of a patient to a medical facility. This is illustrated in the embodiment of FIG. 10, which shows two different views 1000A and 1000B of an information processing system, one illustrating a process associated with a patient entering a doctor's office at a medical facility 1005 and the other illustrating a process associated with the patient leaving the doctor's office at the medical facility 1005 after his or her visit. The patient is equipped with a mobile device 1001, illustratively a mobile telephone, configured to store sensitive medical data. Additionally or alternatively, that sensitive medical data can be stored in a patient cloud for which the patient is a tenant of a corresponding cloud service provider. The doctor's office at the medical facility includes or otherwise has access to cloud 1004 including one or more patient applications running in one or more containers on the cloud. The one or more applications include analytics functionality for processing patient data including data regarding past visits.

In the view as shown at 1000A, the process includes the following steps:

1. Patient enters doctor's office at medical facility 1005. The patient via mobile phone 1001 checks in with the doctor's patient application running in cloud 1004. There is no need to check in with a human receptionist.

2. The doctor via the patient application requests access to the sensitive data of the patient. This data can include past visit information, prescriptions, other medical specialists, links to medical images, and even current patient heart rate and activity levels, as well as numerous additional or alternative types of data. The data is assumed to be stored in a lightweight container of the type described previously. As noted above, such a container comprises an isolated container file system including metadata. The metadata may comprise a data encryption key encrypted under a key encryption key.

3. The patient accepts the request. The corresponding container is migrated or replicated from the patient's phone 1001 or from a patient cloud to the cloud 1004 of the doctor's office.

4. The patient data is now accessible to the cloud 1004 subject to authentication and authorization by the patient. However, due to the structure of the container, the data is not accessible to the container host device or to other containers running in the cloud 1004. Granting the doctor permission to access this data allows the doctor to run analytics and perform other types of diagnostics on the data via the patient application running in cloud 1004.

5. The doctor now has access to the patient medical history and associated analytical results.

In the view as shown at 1000B, the process includes the following steps:

1. The doctor updates the patient's records and saves the updates back to the original patient data set.

2. The updated patient data is given back to the patient and any associated security information is deleted from the cloud 1004. The container comprising this data is migrated from the cloud 1004 back to the mobile phone 1001 or to the appropriate cloud location for which the patient is a tenant.

3. The patient leaves the doctor's office in the medical facility 1005.

In this embodiment, the lightweight container storing sensitive medical data remains under the control of the patient and is not persisted in the cloud 1004. When in the cloud 1004, the data is protected from access by the container host devices as well as other containers that may run on those devices.

It should again be noted that the particular arrangements of components in the systems of FIGS. 5 through 10, like those of the system 100 described in conjunction with FIGS. 1 through 3, are presented by way of illustrative example only, and should not be construed as limiting in any way. As noted above, the described functionality can be implemented using additional or alternative components. Accordingly, a wide variety of different security layer configurations can be used in other embodiments.

The illustrative embodiments described above provide significant advantages over conventional arrangements.

For example, some embodiments facilitate the use of containers in multi-tenant environments by providing a mechanism through which each tenant can securely access its private data within one or more containers running on a container host device. Such an arrangement can avoid difficulties associated with providing isolation of storage resources between multiple tenants, leading to improved security and performance in an information processing system comprising a multi-tenant storage environment.

In addition, as some embodiments of the invention address storage isolation drawbacks of conventional Docker implementations, these embodiments make Docker containers more suitable for use in multi-tenant environments. However, the disclosed arrangements are also applicable to other types of LXCs or containers generally.

In some embodiments, an application file system security layer is configured within a given container to perform private data encryption and security policy enforcement for that container under the control of its corresponding tenant. Such an arrangement is independent of container type and can be deployed on any type of container hosts. It is applicable to a wide variety of different cloud platforms, including PaaS and IaaS clouds, as well as numerous other container-based processing platforms.

Some embodiments can be configured to effectively prevent a malicious application executing in a given container or on a container host device from obtaining access to data not belonging to that application, such as data belonging to other applications running in containers of other tenants of a multi-tenant environment. In addition, this protection is provided in a manner that is highly flexible and easy to implement, and does not impede legitimate movement of containers between different hosts or movement of associated data between different storage platforms.

It is to be appreciated that the foregoing advantages are illustrative of advantages provided in certain embodiments, and need not be present in other embodiments.

It should be understood that the particular sets of modules and other components implemented in the information processing systems as described above are presented by way of example only. In other embodiments, only subsets of these components, or additional or alternative sets of components, may be used, and such components may exhibit alternative functionality and configurations. For example, numerous alternative multi-tenant environments can be provided comprising multiple containers utilizing respective provisioned portions of underlying storage resources of a storage platform.

Also, the particular processing operations and other system functionality described in conjunction with the flow diagram of FIG. 4 are presented by way of illustrative example only, and should not be construed as limiting the scope of the invention in any way. Alternative embodiments can use other types of processing operations involving other information processing system components.

It is to be appreciated that functionality such as that described in conjunction with the diagrams of FIGS. 1 through 10 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally comprise other virtualization infrastructure such as virtual machines implemented using a hypervisor. Such cloud infrastructure can therefore be used to provide what is also referred to herein as a multi-tenant environment.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Such information processing system components can communicate with other system components over any type of network or other communication media.

It should again be emphasized that the above-described embodiments of the invention are presented for purposes of illustration only. Many variations and other alternative embodiments may be used. For example, the disclosed techniques are applicable to a wide variety of other types and arrangements of information processing systems, multi-tenant environments, containers, security layers, encryption engines and storage resources that can benefit from enhanced security for tenant data. Also, the particular configurations of system and device elements shown in FIGS. 1 and 3-10 and the processing operations in FIGS. 4 and 10 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one container host device implementing containers for respective tenants of a multi-tenant environment, wherein the containers comprise reconfigurable virtual resources of at least one processing platform comprising the at least one container host device;
the containers being configured to utilize storage resources of at least one storage platform;
wherein a given one of the containers comprises:
at least one application; and
an application file system security layer configured to communicate with the at least one storage platform;
the application file system security layer comprising:
a container storage volume supported by the at least one storage platform; and
an encryption engine configured to encrypt and decrypt data of the container storage volume utilizing one or more data encryption keys that are encrypted under a tenant-specific key encryption key;
wherein the tenant-specific key encryption key is provided to the application file system security layer by a tenant key manager that is external to the given container;
wherein at least a portion of a given file of the container storage volume is encrypted by the encryption engine using a particular one of the one or more data encryption keys;
wherein the encryption engine is configured to provide, in association with the given file, metadata comprising the particular one of the one or more data encryption keys encrypted under the tenant-specific key encryption key; and
wherein the at least one container host device comprises at least one hardware processor coupled to a memory.

2. The apparatus of claim 1, wherein the tenant key manager is controlled by a given one of the respective tenants for which the given container is implemented but is outside the control of the at least one container host device and one or more associated administrative entities.

3. The apparatus of claim 1, wherein the tenant key manager stores a plurality of tenant-specific key encryption keys for at least one of the respective tenants associated with the tenant key manager.

4. The apparatus of claim 1, wherein each of the respective tenants of the multi-tenant environment is associated with a separate tenant key manager that is external to the containers implemented for the respective tenants.

5. The apparatus of claim 1, wherein the given container and one or more encrypted files of the container storage volume of the given container are movable from the at least one container host device to another container host device preserving access of the application file system security layer to the tenant key manager for decrypting the one or more encrypted files of the container storage volume by the encryption engine subsequent to movement of the given container to the other container host device.

6. An apparatus comprising:
at least one container host device implementing containers for respective tenants of a multi-tenant environment, wherein the containers comprise reconfigurable virtual resources of at least one processing platform comprising the at least one container host device;
the containers being configured to utilize storage resources of at least one storage platform;
wherein a given one of the containers comprises:
at least one application; and
an application file system security layer configured to communicate with the at least one storage platform;

the application file system security layer comprising:
- a container storage volume supported by the at least one storage platform; and
- an encryption engine configured to encrypt and decrypt data of the container storage volume utilizing one or more data encryption keys that are encrypted under a tenant-specific key encryption key;

wherein the tenant-specific key encryption key is provided to the application file system security layer by a tenant key manager that is external to the given container;

wherein the given container and one or more encrypted files of the container storage volume of the given container are movable from the at least one container host device to another container host device preserving access of the application file system security layer to the tenant key manager for decrypting the one or more encrypted files of the container storage volume by the encryption engine subsequent to movement of the given container to the other container host device;

wherein movement of the given container and one or more encrypted files of the container storage volume from the at least one container host device to the other container host device is controlled responsive to one or more tenant-specified trigger conditions; and wherein the at least one container host device comprises at least one hardware processor coupled to a memory.

7. The apparatus of claim 6, wherein the one or more tenant-specified trigger conditions include at least one trigger condition based at least in part on detection of a current location of a corresponding tenant device.

8. The apparatus of claim 1, wherein the application file system security layer is configured to communicate with an application programming interface of a file system of the at least one storage platform.

9. The apparatus of claim 1, wherein the at least one storage platform comprises at least one of:
- a local file share controlled by the at least one container host device;
- at least one of a network file share, network object storage and network block storage controlled by a given one of the respective tenants.

10. The apparatus of claim 1, wherein the application file system security layer provides secure file folders to the one or more applications of the given container with the secure file folders being inaccessible to one or more containers of the multi-tenant environment other than the given container and to an administrative entity of the at least one container host device.

11. The apparatus of claim 1, wherein the application file system security layer is configured to directly access a file system of the at least one storage platform while bypassing a union file system of the at least one container host device.

12. The apparatus of claim 1, wherein configuration and operation of the application file system security layer is in accordance with one or more policies specified by a given one of the respective tenants for which the given container is implemented.

13. The apparatus of claim 1, wherein the application file system security layer is implemented at least in part within the at least one application of the given container.

14. The apparatus of claim 1, wherein one or more encrypted files of the container storage volume are movable from a first storage platform to a second storage platform preserving access of the application file system security layer to the tenant key manager for decryption of the one or more encrypted files of the container storage volume by the encryption engine subsequent to movement of the one or more encrypted files from the first storage platform to the second storage platform, and wherein movement of the one or more encrypted files is controlled responsive to one or more tenant-specified trigger conditions.

15. A method comprising:
implementing containers for respective tenants of a multi-tenant environment on at least one container host device, wherein the containers comprise reconfigurable virtual resources of at least one processing platform comprising the at least one container host device;

configuring the containers to utilize storage resources of at least one storage platform including for each of the containers at least one container storage volume;

for a given one of the containers, encrypting and decrypting data of the at least one container storage volume utilizing one or more data encryption keys that are encrypted under a tenant-specific key encryption key;

wherein the tenant-specific key encryption key is provided by a tenant key manager that is external to the given container and controlled by a given one of the respective tenants for which the given container is implemented;

wherein at least a portion of a given file of the at least one container storage volume is encrypted using a particular one of the one or more data encryption keys; and providing, in association with the given file, metadata that includes the particular one of the one or more data encryption keys encrypted under the tenant-specific key encryption key;

wherein the method is implemented using at least one processing device comprising a hardware processor coupled to a memory.

16. The method of claim 15, wherein the given container and one or more encrypted files of the at least one container storage volume of the given container are movable from the at least one container host device to another container host device preserving access of an application file system security layer to the tenant key manager for decryption of the one or more encrypted files of the at least one container storage volume by the encryption engine subsequent to movement of the given container to the other container host device.

17. A non-transitory processor-readable storage medium having stored therein program code of one or more software programs, wherein the program code when executed by at least one processing device causes the processing device:
to implement containers for respective tenants of a multi-tenant environment on at least one container host device, wherein the containers comprise reconfigurable virtual resources of at least one processing platform comprising the at least one container host device;

to configure the containers to utilize storage resources of at least one storage platform including for each of the containers at least one container storage volume;

for a given one of the containers, to encrypt and decrypt data of the at least one container storage volume utilizing one or more data encryption keys that are encrypted under a tenant-specific key encryption key;

wherein the tenant-specific key encryption key is provided by a tenant key manager that is external to the given container and controlled by a given one of the respective tenants for which the given container is implemented;

wherein at least a portion of a given file of the at least one container storage volume is encrypted using a particular one of the one or more data encryption keys; and to provide, in association with the given file, metadata that includes the particular one of the one or more data encryption keys encrypted under the tenant-specific key encryption key.

18. The method of claim 16, wherein movement of the given container and one or more encrypted files of the at least one container storage volume from the at least one container host device to the other container host device is controlled responsive to one or more tenant-specified trigger conditions.

19. The non-transitory processor-readable storage medium of claim 17, wherein the given container and one or more encrypted files of the at least one container storage volume of the given container are movable from the at least one container host device to another container host device preserving access of an application file system security layer to the tenant key manager for decryption of the one or more encrypted files of the at least one container storage volume by the encryption engine subsequent to movement of the given container to the other container host device.

20. The non-transitory processor-readable storage medium of claim 19, wherein movement of the given container and one or more encrypted files of the container storage volume from the at least one container host device to the other container host device is controlled responsive to one or more tenant-specified trigger conditions.

\* \* \* \* \*